United States Patent
Bober et al.

(10) Patent No.: US 7,440,636 B2
(45) Date of Patent: Oct. 21, 2008

(54) METHOD AND APPARATUS FOR IMAGE PROCESSING

(75) Inventors: Miroslaw Z Bober, Guildford (GB); Wieslaw J. Szajnowski, Guildford (GB)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 635 days.

(21) Appl. No.: 10/609,374

(22) Filed: Jul. 1, 2003

(65) Prior Publication Data

US 2004/0114830 A1     Jun. 17, 2004

(30) Foreign Application Priority Data

Jul. 1, 2002   (EP) ................................. 02254613

(51) Int. Cl.
*G06K 9/00*   (2006.01)
*G06K 9/36*   (2006.01)

(52) U.S. Cl. ...................... 382/281; 382/168
(58) Field of Classification Search ................ 382/281, 382/168
See application file for complete search history.

(56) References Cited

U.S. PATENT DOCUMENTS

| 5,629,989 | A | * | 5/1997 | Osada ........................ 382/281 |
| 5,638,465 | A | * | 6/1997 | Sano et al. .................. 382/281 |
| 6,363,161 | B2 | * | 3/2002 | Laumeyer et al. ............ 382/104 |

FOREIGN PATENT DOCUMENTS

| EP | 0 939 381 A2 | 9/1999 |
| WO | WO-00/11609 A1 | 3/2000 |

OTHER PUBLICATIONS

Pires et al., "Line Extraction with the use of an automatic Gradient Threshold Technique and the Hough Transform," *IEEE*, pp. 909-912, 2000.

* cited by examiner

*Primary Examiner*—Matthew C. Bella
*Assistant Examiner*—Wesley Tucker
(74) *Attorney, Agent, or Firm*—Birch, Stewart, Kolasch & Birch, LLP

(57) ABSTRACT

A method of analysing an image comprises performing a Hough transform on points in an image space to an n-dimensional Hough space, selecting points in the Hough space representing features in the image space, and analysing m of the n variables for the selected points, where m is less than n, for information about the features in the image space.

19 Claims, 6 Drawing Sheets

METHOD AND APPARATUS FOR IMAGE PROCESSING

The invention relates to a method and apparatus for processing images. More specifically, the invention is concerned with detecting and identifying specific features or types of features in images, and classifying objects and regions in images.

The invention is especially useful for the detection of man-made structures in images, which has applications, for example, in photo-interpretation, cartography and surveillance.

Methods of identifying features such as lines and edges in images are known. Simple methods of linking edges into object boundaries are also known, but these are generally successful only for relatively simple scenes. It is also known to use model-based techniques for identifying specific features in images, but these techniques require prepared reference models, which may not necessarily be available for all features. Other approaches attempt to infer 3-D structure, but are often not reliable and may require multiple views of a scene.

Furthermore, it is especially difficult to detect man-made structures and urban areas in images, for a number of reasons. For example, contrast between buildings and surrounding structures can be very low, causing low-level segmentation and edge extraction to be fragmented. In addition, small structures, such as cars, trees or rocks adjacent to large structures, such as buildings, can cause further problems at a segmentation stage and give rise to noisy and perturbated, or phantom boundaries. The problem is often further complicated by the existence of shadows and markings.

In the specification, references to an image include a whole image and a region of an image.

Aspects of the invention are set out in the accompanying claims.

According to a first aspect of the invention, there is provided a method of analysing an image comprising performing a Hough transform on points in an image space to an n-dimensional Hough space, selecting points in the Hough space representing features in the image space, and analysing m of the n variables for the selected points, where m is less than n, to derive information about the features in the image space.

More specifically, feature points in an image are extracted, for example, using feature detecting means such as an edge or corner detector, or other similar feature detecting means. The feature points undergo the Hough transform, and the image of the feature points in the Hough space are analysed.

As a result of the invention it is possible to draw more reliable conclusions about features in images. The technique does not require a model of a structure and handles boundary and segmentation problems well.

Figure 1:
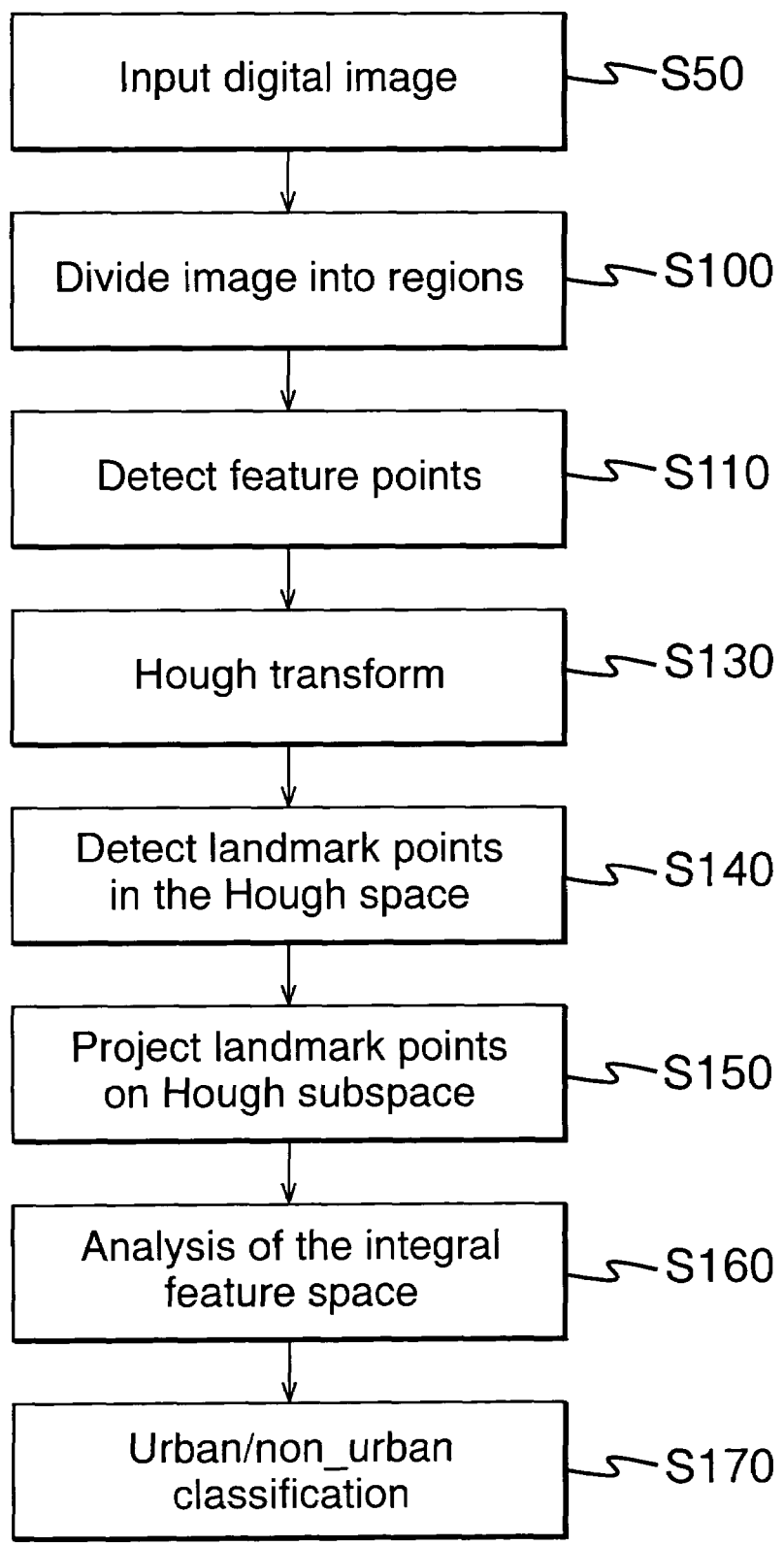
Figure 2:
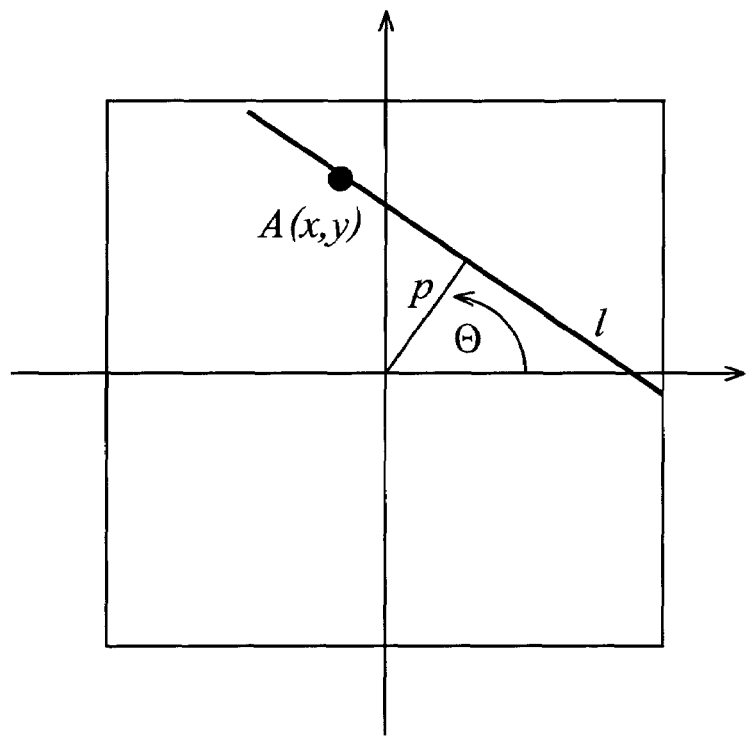
Figure 3:
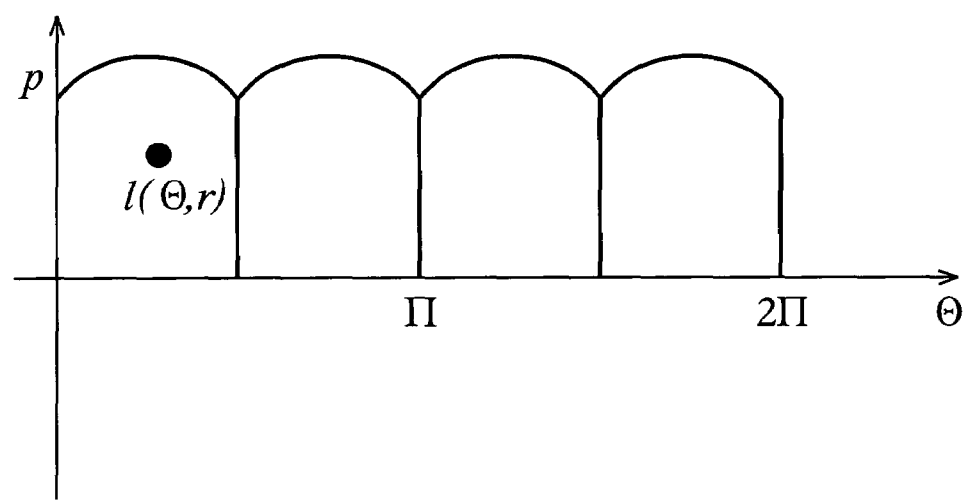
Figure 4:
Figure 5:
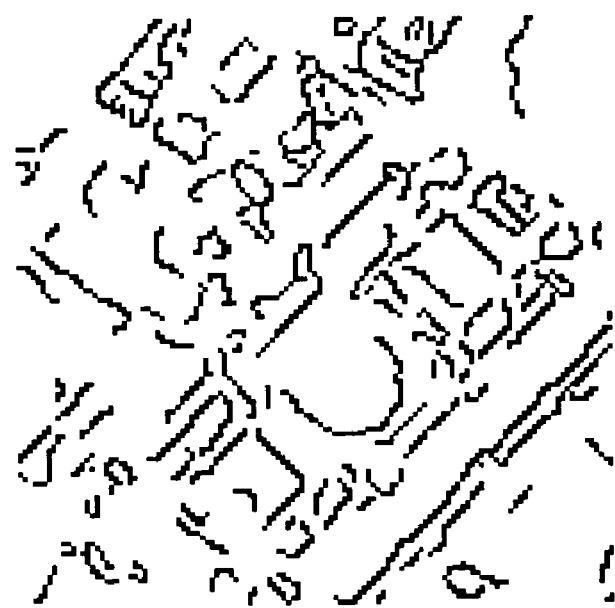
Figure 6:
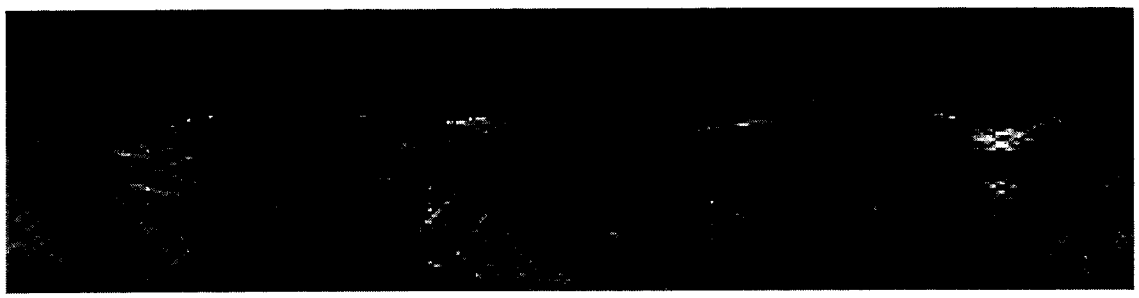
Figure 7:
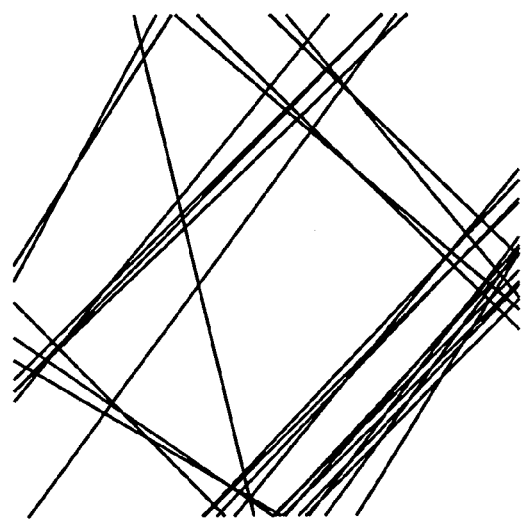
Figure 8:
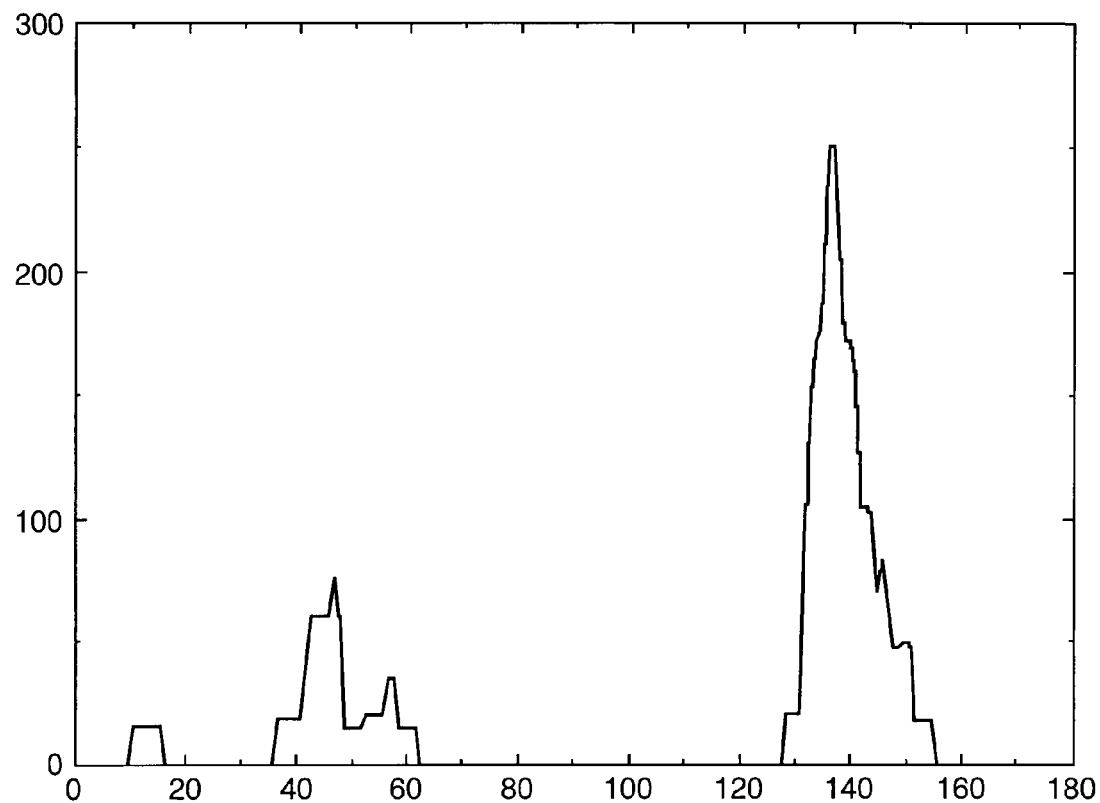
Figure 9:
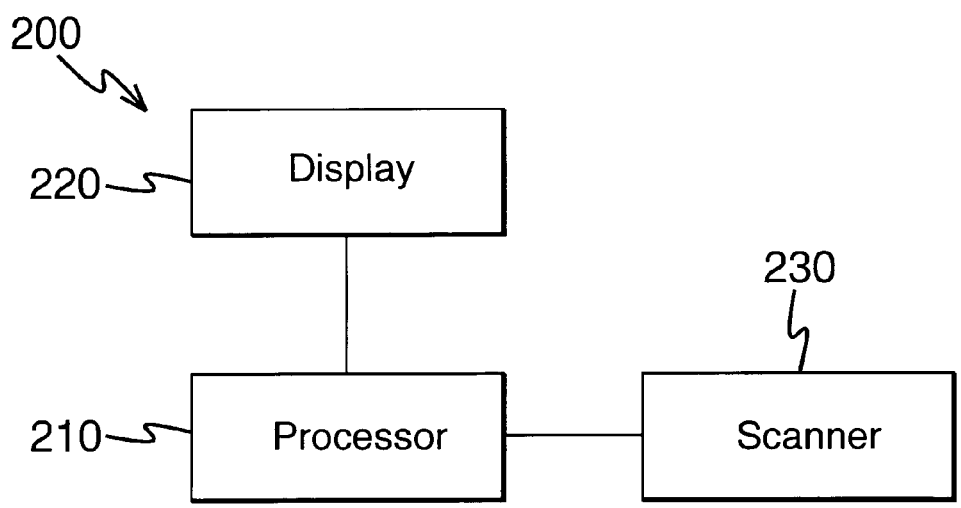
Figure 10:
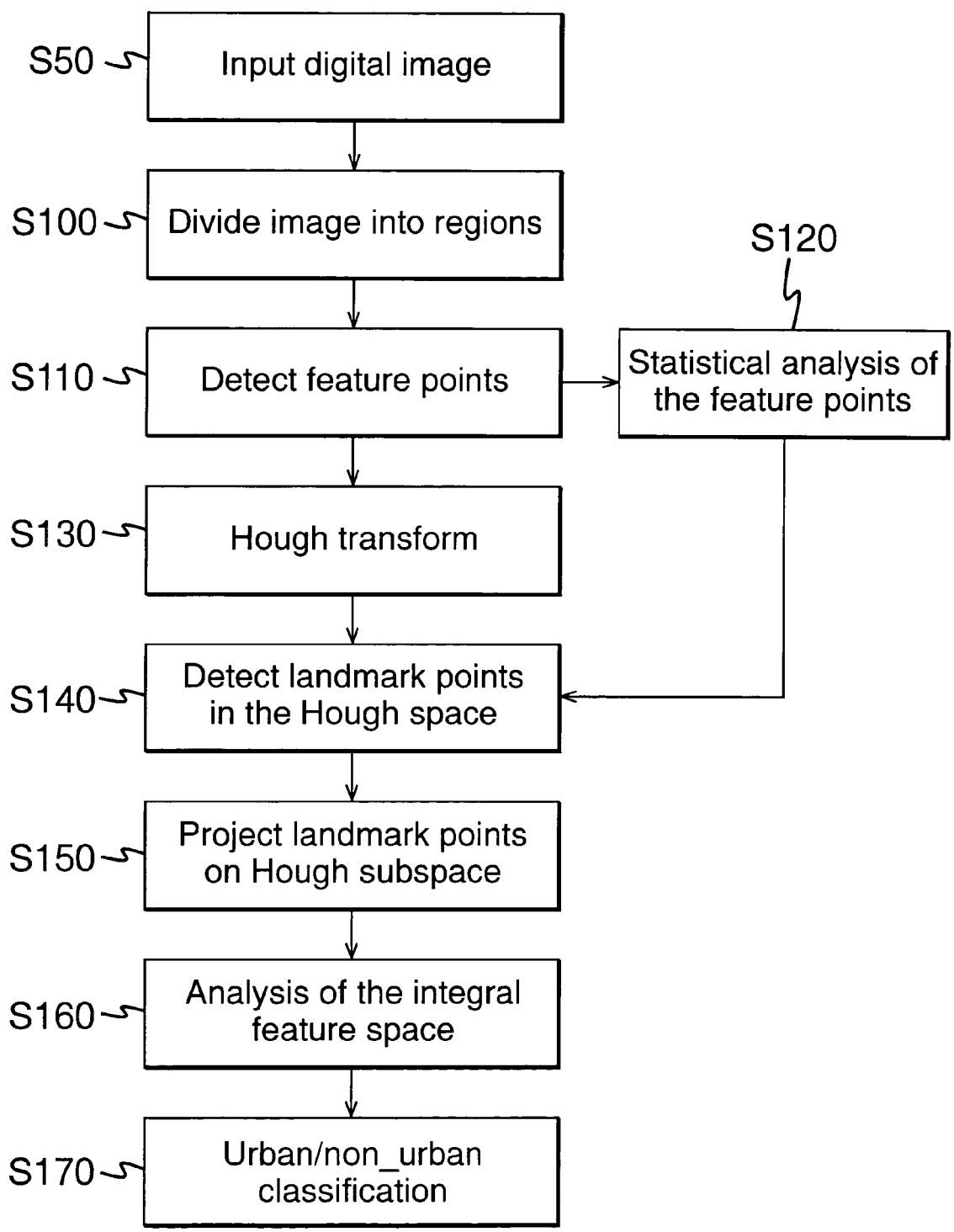

Embodiments of the invention will be described with reference to the accompanying drawings of which:

FIG. 1 is a flow diagram illustrating a method according to an embodiment of the invention;
FIG. 2 is a diagram illustrating the Hough transform;
FIG. 3 is another diagram illustrating the Hough transform;
FIG. 4 is an example image showing man-made structures;
FIG. 5 is an image showing the results of an edge detection process on the image of FIG. 4;
FIG. 6 is an image showing the result of a Hough transform performed on the points in the image of FIG. 5;
FIG. 7 is an image showing the results of an inverse Hough transform based on FIG. 6;
FIG. 8 is a graph showing the results of a mapping from Hough space based on FIG. 6;
FIG. 9 is a schematic diagram of an apparatus according to an embodiment of the invention;
FIG. 10 is a flow chart illustrating a second embodiment of the invention.

The first embodiment will be described with reference to the example image region shown in FIG. 4, which includes a number of buildings, ie man-made structures, and the flow diagram in FIG. 1.

In this embodiment, the method is performed using a computer, illustrated generally by the reference number 200 in FIG. 9, programmed to execute the method using suitable software. The computer 200 includes a processor 210, image display means in the form of a display 220 and image input means in the form of a scanner 230.

As a first step, step 50, a digital image is input to the computer. In the present embodiment, the image is input using a scanner 230 scanning a photograph, although other input means may be used, or an image may be retrieved from data storage means.

At step 100, the image is divided into sub-regions. Here, the regions are blocks of 256×256 pixels. The blocks may be overlapping or non-overlapping. In this embodiment, the blocks are non-overlapping and adjoining. FIG. 4 shows one block.

The next step, step 110, is the detection of feature points in each block. In the present embodiment, the positions of feature points of potential interest are identified in the image using an edge detector, which identifies discontinuities in pixel values. Various edge detectors are known and can be used; in this embodiment a Canny edge detector is used.

The edge detection step classifies each pixel in the image regions as either a one of feature points or not a feature point and produces a binary image accordingly. FIG. 5. is a binary image showing feature points in the image region of FIG. 4.

In step 130, the feature points in FIG. 5 are represented in Hough space using a Hough transform for line detection.

A general discussion of the Hough transform follows.

FIGS. 2 and 3 illustrate the Hough transform. Hough transform is used to detect curves that can be expressed in a parametric form. The Hough transform projects feature points in image space (FIG. 2) to points in parameter space also called Hough space (FIG. 3). Each point in the image space "votes" for all sets of parameters (e.g. points in the hough space) that generate parametric curves passing through that point. Referring to FIG. 2, for a point A(x,y) consider one line passing through that point. The perpendicular from the line to the origin has a length p and is at an angle θ from the x axis, and the variables p and θ define that line in Hough space, as shown by the dot in FIG. 3. The Hough transform of a point in image space takes all the possible lines passing through a point A(x,y) and plots the resulting (p, θ) parameter values in Hough space.

FIG. 3 shows the boundaries in Hough space. The horizontal axis corresponds to the θ values which vary from 0 to 2π, as can be understood from FIG. 2. The vertical axis corresponds to the p values and varies between a minimum of a and $a\sqrt{2}$ in cycles for each π/2 radians, where 2a is the width of the block shown in FIG. 2.

In the Hough transform, each feature point in image space is transformed to points in Hough space. Processing of plurality of point in image space results in accumulation of points at some p, θ locations in the Hough space, and co-linear points in the image space result in peaks, or local maxima, in the Hough space. The local maxima are extracted and then an inverse Hough transform is applied to map back into the image space to derive each line corresponding to each respective local maximum. The resulting lines are of infinite length, and so the lines are combined to get an idea of the shapes corresponding to the feature points in the original image space.

In this specification, the dimension of the Hough space relates to the number of parameters defining the parametric curve. Thus, in the case of a Hough transform for detecting lines, a point (x,y) in image space is mapped onto a point (p, θ) in two-dimensional Hough space.

FIG. 6 illustrates the result of the Hough transform performed on the feature points in FIG. 5. The intensity values in FIG. 6 correspond to the accumulated values so that peaks in Hough space are shown as the brightest points (local peaks being the locally brightest points).

In step 140, landmark points are selected. First, the local maxima of the accumulator values in the Hough space are detected. FIG. 7 illustrates the lines in image space corresponding to the local peaks in Hough space. The accumulator values for the local maxima are compared with a threshold. In this embodiment, the threshold is a predetermined percentage (80%) of the global maximum accumulator value, for the block. The (p, θ) values for the local maxima which exceed the threshold are selected as a subset, which is called the landmark subset. The threshold may vary. For example, other percentages can be used, and the global maximum may instead be for the whole image, or the threshold may be determined in other ways.

The local maxima in the landmark subset are then processed further, in step 150. In this embodiment, the (p, θ) values in the landmark subset are projected onto the θ axis and accumulated. This results in a graph as shown in FIG. 8 for the present example. The result of the projection is analysed to determine characteristics about the lines corresponding to the landmark subset. More specifically, in this embodiment, the relative angles of the lines for the landmark subset are analysed. As can be seen from FIG. 8, the highest peaks correspond to prominent directions of 46 and 136°. This indicates a large number of lines intersecting at 90°, which suggests a man-made environment such as urban area. Similarly, a large single peak suggests parallel lines which generally occur in a man-made environment.

Other projections onto other variables could be used. For example, the projection could be onto the p axis.

A second embodiment will now be described with reference to the flow chart in FIG. 10. The flow chart in FIG. 10 is the same as the flow chart in FIG. 1, except that there is an additional step, step 120, between steps 110 and 140.

The second embodiment is similar to the first embodiment, apart from differences discussed below.

In the step of detection of feature points, step 110, the edge detection in this embodiment assigns values indicating whether a feature is present at given location, to points in the image. For example, an edge confidence measure taking values between 0 and 1 can be used, higher values indicating higher confidence in existence of an edge, resulting in a probability map for edge feature points. Other features can be also used, for example corners or colour features.

In step 120, after step 110, a statistical analysis of the feature points detected in step 110 is performed for each block. More specifically, the confidence values are made into a histogram for each block. Also, the density of feature points for each block is calculated. Other statistical information relating to the distribution of feature points in the blocks may also be derived. This statistical information is used in subsequent processing, in selecting landmark points.

A threshold for detecting landmark points can be derived as follows. A large number of randomly selected representative configurations of feature points are generated for a given block size. For each configuration, the Hough transform is performed, and a histogram of accumulated values in Hough space is determined. The histograms for all the configurations are combined (eg averaged) and used to determine a suitable threshold for detecting landmark points.

For example, a value equivalent to the highest value observed in the combined histogram may be used as this threshold.

The combined histogram is a reflection of the image in Hough space arising from general random image behaviour, in the particular application, eg for the specific block size. In other words, this approach gives an indication of peaks in Hough space that occur randomly and do not necessarily correspond to landmark points in an image, ie noise. The threshold can be varied according to the level of confidence required in the landmark point extraction. For example, a higher threshold, such as three times the highest value in the combined histogram, increases the exclusion of landmark points that occur by chance, but on the other hand it increases the risk of excluding possible points of interest. Similarly, a reduction of the threshold, such as to 80% of the highest value in the combined histogram, increases the likelihood of returning points of interest correctly, but also increases the risk of returning false points.

Other statistical information as described above can be used in deriving the threshold information. For example, the randomly selected representative configurations of feature points may take into account the density of feature points for the image region under consideration, that is, they have a similar density, and similarly for the other statistical information as appropriate. In order to simplify processing, the modelling for generating reference histograms from the randomly generated images and corresponding thresholds can be performed offline and the histograms or threshold values stored, for example, in a look-up table.

The embodiments described above use a Hough transform for detecting lines. The Hough transform can also be used to detect other regular curves such as circles, ellipses, and even in applications where a simple analytic description of a feature is not possible, although in such cases the computational complexity increases. The invention can also be used in these other applications of the Hough transform principle. For example, the invention could be used in analysing the relationship between the centres of circles, where a regular spacing of circle centres suggests human influence.

The invention can be implemented by any suitable apparatus, such as a suitably programmed computer which is either a dedicated application specific computer or a computer supplied with suitable software to execute the method or implemented in hardware such as a specially designed integrated circuit. The apparatus may include image input means such as a scanner, digital camera, internet link, or a connection to image storage means such as a data carrier.

The invention claimed is:

1. A method of analysing an image comprising performing a Hough transform on points in an image space to a 2-dimensional Hough space, to derive a histogram of accumulated values in Hough space, selecting points in the Hough space representing features in the image space, wherein said selected points are peaks of the histogram of accumulated values in Hough space, characterised by projecting and accumulating said selected points onto one axis of the two axes of the Hough space, and analysing the variable corresponding to said one axis and the corresponding accumulated selected points values to derive information about the features in the image space.

2. The method of claim 1 comprising detecting points for the Hough transform using feature detecting means comprising any of edge or corner detecting means or colour feature detecting means.

3. The method of claim 1 wherein said step of analyzing the variable and the corresponding accumulated selected points values comprises identifying peaks in the accumulated selected points values.

4. The method of claim 3 comprising analysing the relationships between the values for the variables corresponding to the peaks in the accumulated selected points values.

5. The method of claim 1 wherein the Hough transform is for detecting lines and maps a point (x, y) in image space to points (r, θ) in Hough space.

6. The method of claim 5 wherein the analysis involves analysing the values of θ.

7. The method of claim 1 wherein the step of selecting points in the Hough space involves identifying local peaks and comparing the local peaks with a threshold.

8. The method of claim 7 wherein the threshold is derived by generating a plurality of random reference images, for each reference image performing a Hough transform and deriving a histogram of accumulated values in Hough space, combining the histograms for the reference images, and using the combined histograms to derive a threshold.

9. The method of claim 8 wherein the reference images have similar statistical properties to the subject image.

10. The method of claim 1 wherein, the analysis of the selected points is for identifying man-made structures and/or for distinguishing between urban/non-urban areas.

11. An apparatus for image analysis comprising: means for processing image signals, means for performing a Hough transform on points in an image space to a 2-dimensional Hough space, to derive a histogram of accumulated values in Hough space, means for selecting points in the Hough space representing features in the image space, wherein said selected points are peaks of the histogram of accumulated values in Hough space, means for projecting and accumulating said selected points onto one axis of the two axes of the Hough space, and means for analysing the variable corresponding to said one axis and the corresponding accumulated selected points values to derive information about the features in the image space.

12. A computer readable medium having stored thereon computer executable program for analysing an image, the computer program when executed causes a computer system to execute steps of: performing a Hough transform on points in an image space to a 2-dimensional Hough space to derive a histogram of accumulated values in Hough space, selecting points in the Hough space representing features in the image space, wherein said selected points are peaks of the histogram of accumulated values in Hough space, characterised by projecting and accumulating said selected points onto one axis of the two axes of the Hough space, and analysing the variable corresponding to said one axis and the corresponding accumulated selected points values to derive information about the features in the image space.

13. A method of generating a threshold for identifying peaks in a histogram of accumulated values derived from a Hough transform of a subject image, each peak representing the same type of feature in the subject image, the method comprising generating a plurality of reference images, for each reference image performing the same Hough transform for identifying said type of feature and deriving a histogram of accumulated values in Hough space, combining the histograms for the reference images for the same type of feature to generate a combined histogram, and using the combined histogram to derive said threshold.

14. The method of claim 13 wherein the reference images have similar statistical properties to the subject image.

15. The method of claim 13 wherein the reference images are randomly generated.

16. The method of claim 14 wherein said combining of histograms comprises averaging the histogram.

17. An apparatus for generating a threshold for identifying peaks in a histogram of accumulated values derived from a Hough transform of a subject image, each peak representing the same type of feature in the subject image comprising: means for generating a plurality of reference images, means, for each reference image, for performing the same Hough transform for identifying said type of feature and deriving a histogram of accumulated values in Hough space, means for combining the histograms for the reference images for the same type of feature to generate a combined histogram, and means for using the combined histogram to derive said threshold.

18. A computer readable medium having stored thereon computer executable program of generating a threshold for identifying peaks in a histogram of accumulated values derived from a Hough transform of a subject image, each peak representing the same type of feature in the subject image, the computer program when executed causes a computer system to execute steps of: generating a plurality of reference images, performing, for each reference image, the same Hough transform for identifying said type of feature and deriving a histogram of accumulated values in Hough space, combining the histograms for the reference images for the same type of feature to generate a combined histogram, and using the combined histogram to derive said threshold.

19. A method of analysing an image comprising performing a Hough transform on points in an image space to an n-dimensional Hough space, to derive a histogram of accumulated values in Hough space, selecting points in the Hough space representing features in the image space, wherein said selected points are peaks of the histogram of accumulated values in Hough space, characterised by projecting and accumulating said selected points onto the axis or axes for m of the n variables, corresponding to the n-dimensions of the Hough space, where m is less than n, and analysing the m variables and the corresponding accumulated selected points values to derive information about the features in the image space.

* * * * *